(12) United States Patent
Park et al.

(10) Patent No.: US 9,017,842 B2
(45) Date of Patent: Apr. 28, 2015

(54) SECONDARY BATTERY PACK PROVIDING EXCELLENT PRODUCTIVITY AND STRUCTURAL STABILITY

(75) Inventors: Youngsun Park, Daejeon (KR); Jeongsuk Lee, Cheongju-si (KR); Keunpyo Ahn, Cheongju-si (KR); Chunyeon Kim, Chungcheongbuk-do (KR); Joung Ho Ha, Cheongwon-gun (KR); Masayuki Wakebe, Chungcheongbuk-do (KR)

(73) Assignee: LG Chem, Ltd., Seoul (KR)

( * ) Notice: Subject to any disclaimer, the term of this patent is extended or adjusted under 35 U.S.C. 154(b) by 896 days.

(21) Appl. No.: 12/744,230

(22) PCT Filed: Nov. 21, 2008

(86) PCT No.: PCT/KR2008/006872
§ 371 (c)(1), (2), (4) Date: Nov. 23, 2010

(87) PCT Pub. No.: WO2009/066953
PCT Pub. Date: May 28, 2009

(65) Prior Publication Data
US 2011/0070466 A1 Mar. 24, 2011

(30) Foreign Application Priority Data

Nov. 23, 2007 (KR) .................. 10-2007-0120543
Nov. 23, 2007 (KR) .................. 10-2007-0120545
Nov. 29, 2007 (KR) .................. 10-2007-0122638

(51) Int. Cl.
*H01M 2/34* (2006.01)
*H01M 2/30* (2006.01)
*H01M 10/42* (2006.01)
*H01M 2/02* (2006.01)
*H01M 2/10* (2006.01)

(52) U.S. Cl.
CPC ............ *H01M 2/30* (2013.01); *H01M 10/4257* (2013.01); *H01M 2/0215* (2013.01); *H01M 2/1061* (2013.01); *H01M 2/34* (2013.01); *H01M 10/425* (2013.01); *H01M 2200/00* (2013.01)

(58) Field of Classification Search
CPC ....................................... H01M 2/34
USPC ................... 429/65, 175, 177, 179
See application file for complete search history.

(56) References Cited

U.S. PATENT DOCUMENTS

| 7,939,189 | B2 * | 5/2011 | Kim et al. ............. 429/7 |
| 8,137,837 | B2 * | 3/2012 | Jung et al. ........... 429/179 |
| 2005/0208345 | A1 | 9/2005 | Yoon et al. |
| 2005/0287400 | A1 | 12/2005 | Cho |
| 2007/0160878 | A1 | 7/2007 | Kim et al. |
| 2007/0287063 | A1 | 12/2007 | Hiratsuka et al. |

FOREIGN PATENT DOCUMENTS

| CN | 1989633 A | 6/2007 |
| JP | 2006-004783 A | 1/2006 |
| JP | 2006-60181 A | 3/2006 |
| KR | 10-2004-0054232 A | 6/2004 |
| KR | 10-2005-0123486 A | 12/2005 |
| KR | 20-0406606 Y1 | 1/2006 |
| KR | 10-2006-0023469 A | 3/2006 |
| KR | 10-2006-0060801 A | 6/2006 |
| KR | 10-0649659 B1 | 11/2006 |
| KR | 10-2007-0025680 A | 3/2007 |
| KR | 10-2007-0043537 A | 4/2007 |
| KR | 10-0776766 B1 | 11/2007 |

* cited by examiner

*Primary Examiner* — Tracy Dove
(74) *Attorney, Agent, or Firm* — Birch, Stewart, Kolasch & Birch, LLP

(57) ABSTRACT

Disclosed herein is a secondary battery pack including a battery cell having an electrode assembly mounted in a battery case together with an electrolyte, the battery case having an open top sealed by a top cap, a protection circuit module having a protection circuit for controlling overcharge, overdischarge, and overcurrent of the battery cell, an insulative mounting member constructed in a structure in which the protection circuit module is loaded at a top of the insulative mounting member, the insulative mounting member being mounted to the top cap of the battery cell, and an insulative cap coupled to an upper end of the battery cell for covering the insulative mounting member in a state in which the protection circuit module is loaded on the insulative mounting member, wherein the top cap is provided with a pair of protrusion-type electrode terminals (a first protrusion-type electrode terminal and a second protrusion-type electrode terminal) connected to a cathode and an anode of the electrode assembly, respectively, the insulative mounting member is provided with through-holes corresponding to the protrusion-type electrode terminals, the protection circuit module is provided with through-holes corresponding to the protrusion-type electrode terminals, and the coupling of the insulative mounting member and the protection circuit module to the battery cell is achieved by successively fixedly inserting the protrusion-type electrode terminals through the through-holes of the insulative mounting member and the protection circuit module.

23 Claims, 10 Drawing Sheets

120a

124a

114a

SECONDARY BATTERY PACK PROVIDING EXCELLENT PRODUCTIVITY AND STRUCTURAL STABILITY

FIELD OF THE INVENTION

The present invention relates to a secondary battery pack providing excellent productivity and structural stability, and, more particularly, to a secondary battery pack including a battery cell, a protection circuit module, an insulative mounting member on which the protection circuit module is loaded, and an insulative cap, wherein a top cap of the battery cell is provided with a pair of protrusion-type electrode terminals connected to a cathode and an anode of an electrode assembly, respectively, the insulative mounting member is provided with through-holes corresponding to the protrusion-type electrode terminals, the protection circuit module is provided with through-holes corresponding to the protrusion-type electrode terminals, and the coupling of the insulative mounting member and the protection circuit module to the battery cell is achieved by successively fixedly inserting the protrusion-type electrode terminals through the through-holes of the insulative mounting member and the protection circuit module.

BACKGROUND OF THE INVENTION

As mobile devices have been increasingly developed, and the demand of such mobile devices has increased, the demand of secondary batteries has also sharply increased. Among them is a lithium secondary battery having high energy density and operating voltage and excellent preservation and service-life characteristics, which has been widely used as an energy source for various electronic products as well as for the mobile devices.

Based on their external and internal structures, secondary batteries are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

Also, the secondary batteries have attracted considerable attention as an energy source for electric vehicles and hybrid electric vehicles, which have been developed to solve problems, such as air pollution, caused by existing gasoline and diesel vehicles using fossil fuel. As a result, kinds of applications using the secondary batteries are being diversified owing to advantages of the secondary batteries, and hereafter the secondary batteries are expected to be applied to more applications and products than now.

However, various combustible materials are contained in the lithium secondary battery. As a result, there is a possibility of danger in that the lithium secondary battery will be heated or explode due to overcharge, overcurrent, or any other external physical impacts. In other words, the lithium secondary battery has low safety. Consequently, a protection circuit module (PCM) for effectively controlling the abnormality of the lithium secondary battery, such as overcharge, is mounted in the lithium secondary battery while the PCM is connected to a battery cell of the lithium secondary battery.

The PCM includes a field effect transistor (FET), which serves as a switching element for controlling electric current conduction, a voltage detector, and passive elements such as a resistor and a capacitor. The PCM interrupts overcharge, overdischarge, overcurrent, short circuits, and reverse voltage of the battery cell to prevent the explosion or the overheating of the battery cell, the leakage of liquid from the battery cell, and the degradation of the charge and discharge characteristics of the battery cell, and to suppress the lowering of the electrical efficiency of the battery cell and the abnormal physicochemical behavior of the battery cell, thereby eliminating dangerous factors from the battery cell and increasing the service life of the battery cell.

Generally, the PCM is electrically connected to the battery cell via conductive nickel plates by welding or soldering. That is, the nickel plates are connected to connection leads of the PCM by welding or soldering, and then the nickel plates are connected to corresponding electrode terminals of the battery cell by welding or soldering. In this way, the PCM is connected to the battery cell to manufacture a battery pack.

In this case, a large number of welding or soldering processes are required to construct the battery pack, and the welding or soldering processes must be carried out with high precision because of the small structure of the secondary battery. As a result, a defect possibility is great. Furthermore, the welding or soldering processes are added during the manufacturing process of a product, which increases the manufacturing costs.

Also, it is required for safety elements, including the PCM, to be maintained in electrical connection with the electrode terminals of the battery cell and, at the same time, to be electrically isolated from other parts of the battery cell. Consequently, a plurality of insulative mounting members are required to achieve such connection, with the result that the battery cell assembling process is complicated. On the other hand, an adhesive may be applied between the safety elements and the insulative mounting members to achieve the coupling between the safety elements and the insulative mounting members. However, this coupling method weakens the strength of the battery cell. Consequently, an electric short circuit may occur in the battery cell due to the weakening of the coupling strength, when external impacts are applied to the battery cell, with the result that the battery cell may catch fire or explode. In other words, safety-related problems may occur.

Therefore, research has been actively made on various technologies for easily assembling the insulative mounting members and the safety elements loaded at the top of the battery cell and, at the same time, increasing the mechanical strength of the battery pack.

In connection with this matter, for example, Korean Patent Application Publication No. 2006-0060801 discloses a secondary battery including an electrode group consisting of a separator and a cathode plate and an anode plate disposed on opposite sides of the separator, a case in which the electrode group is mounted, a cap assembly coupled to the case for sealing the case, the cap assembly having external terminals electrically connected to the electrode group, gaskets disposed in corresponding external terminal through-holes formed at the cap assembly such that the gaskets are disposed between the corresponding external terminals and the corresponding through-holes, and coupling members fitted on the external terminals such that the coupling members are coupled to the corresponding external terminals in tight contact with the gaskets.

However, it is not possible for the two external terminals, formed at the cap assembly and electrically connected to the electrode group, to fixedly couple the safety elements, including the protection circuit modules, loaded at the top of the battery cell, with the result that it is difficult to increase the mechanical strength of the top of the battery cell.

Also, Korean Patent Application Publication No. 2004-0054232 discloses a secondary battery including an electrode assembly consisting of a cathode plate, an anode plate, and a separator disposed between the cathode plate and the anode plate, a container in which the electrode assembly is received together with an electrolyte, the container being made of a conductive metal material, the container being provided at the bottom thereof with at least one fixing protrusion, a cap plate coupled in an opening formed at the container, the cap plate being provided at one side of the upper part thereof with at least one groove, a cap assembly inserted through the cap plate such that the cap assembly is isolated from the cap plate by a gasket, the cap assembly having an electrode terminal connected to any one of the tabs withdrawn from the cathode and anode plates, and a lead plate coupled in the groove of the cap plate, which is achieved by inserting the lead plate into the groove and pressing the lead plate, the lead plate being connected to a safety device.

The lead plate, coupled in the cap plate by pressing, serves to securely fix the safety device located at the top of the battery cell, thereby somewhat increasing the mechanical strength of a battery pack. However, a protection circuit module is still coupled to the electrode terminals of the battery cell by welding or soldering, with the result that a battery pack assembling process is complicated.

Consequently, there is a high necessity for a technology that is capable of reducing the number of members mounted to the top of the battery cell to simplify the assembling process and achieving the connection between the protection circuit module and the insulative mounting members in a no-welding manner while stably securing the coupling strength therebetween.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present application have developed a secondary battery pack in which a top cap of a battery cell and a protection circuit module and an insulative mounting member mounted at the upper end of the battery cell are coupled to one another through a specific coupling structure, and found that it is possible to greatly simplify a process for assembling the secondary battery pack with the above-stated construction, and the secondary battery pack exhibits excellent structural stability by virtue of increased coupling strength.

Therefore, it is an object of the present invention to provide a secondary battery pack in which a battery cell and a protection circuit module and an insulative mounting member mounted at the top of the battery cell are coupled to one another through a specific coupling structure.

In accordance with one aspect of the present invention, the above and other objects can be accomplished by the provision of a secondary battery pack including a battery cell having an electrode assembly mounted in a battery case together with an electrolyte, the battery case having an open top sealed by a top cap, a protection circuit module having a protection circuit for controlling overcharge, overdischarge, and overcurrent of the battery cell, an insulative mounting member constructed in a structure in which the protection circuit module is loaded at a top of the insulative mounting member, the insulative mounting member being mounted to the top cap of the battery cell, and an insulative cap coupled to an upper end of the battery cell for covering the insulative mounting member in a state in which the protection circuit module is loaded on the insulative mounting member, wherein the top cap is provided with a pair of protrusion-type electrode terminals (a first protrusion-type electrode terminal and a second protrusion-type electrode terminal) connected to a cathode and an anode of the electrode assembly, respectively, the insulative mounting member is provided with through-holes corresponding to the protrusion-type electrode terminals, the protection circuit module is provided with through-holes corresponding to the protrusion-type electrode terminals, and the coupling of the insulative mounting member and the protection circuit module to the battery cell is achieved by successively fixedly inserting the protrusion-type electrode terminals through the through-holes of the insulative mounting member and the protection circuit module.

That is, the secondary battery pack according to the present invention is constituted by the battery cell, the protection circuit module, the insulative mounting member, and the insulative cap, and the coupling of the insulative mounting member and the protection circuit module to the battery cell is achieved by successively fixedly inserting the protrusion-type electrode terminals through the corresponding through-holes of the insulative mounting member and the protection circuit module. Consequently, the assembly of the secondary battery pack is achieved in a simple coupling fashion.

Also, in the secondary battery pack according to the present invention, the insulative mounting member and the protection circuit module are configured in a structure in which the mechanical coupling between the insulative mounting member and the protection circuit module is easily achieved. Consequently, the manufacturing process is simplified and a coupling structure very stable against external impact or vibration is provided, as compared with the conventional secondary battery pack constructed in a structure requiring several welding or soldering processes.

The protrusion-type electrode terminals may be fixedly inserted through the through-holes of the insulative mounting member and the protection circuit module in various manners. The fixed insertion of the protrusion-type electrode terminals through the through-holes of the insulative mounting member and the protection circuit module is not particularly restricted as long as the coupling strength between the protrusion-type electrode terminals and the corresponding through-holes of the insulative mounting member and the protection circuit module is increased, and the electrical connection between the electrode terminals and the protection circuit module is achieved.

In an exemplary example, the protrusion-type electrode terminals may be configured in a conductive rivet structure. In this case, ends of the protrusion-type electrode terminals of the rivet structure protrude from the top of the protection circuit module by a predetermined length, and the ends of the protrusion-type electrode terminals are pressed to be fixed to the protection circuit module. Specifically, the coupling of the insulative mounting member and the protection circuit module to the battery cell and the electrical connection between the protection circuit module and the electrode terminals are simultaneously achieved by a series of simple processes including forming a pair of conductive rivets at the top cap such that the conductive rivets are connected to the cathode and the anode of the electrode assembly, respectively, successively inserting the rivets through the corresponding through-holes of the insulative mounting member and the protection circuit module, and pressing ends of the electrode terminals protruding from the top of the protection circuit module. The pressing of the ends of the protrusion-type electrode terminals further increases the strength of the coupling of the insulative mounting member and the protection circuit module to the battery cell.

In another example, the protrusion-type electrode terminals may be configured in a structure in which, when the protrusion-type electrode terminals are inserted through the corresponding through-holes of the insulative mounting member and the protection circuit module, ends of the protrusion-type electrode terminals protrude from the top of the protection circuit module by a predetermined length, and then the ends of the protrusion-type electrode terminals are fixed to the protection circuit module in a mechanical coupling fashion. The mechanical coupling between the protrusion-type electrode terminals and the protection circuit module is not particularly restricted. In an exemplary example, the coupling between the protrusion-type electrode terminals and the protection circuit module may be achieved by the threaded engagement based on female-screw and male-screw structures.

In addition that the protrusion-type electrode terminals fixedly couple the protection circuit module and the insulative mounting member to the upper end of the battery cell, on the other hand, the protrusion-type electrode terminals may be configured in a structure to allow the battery cell to be easily manufactured and to simplify the structure of the battery cell.

For example, at least one of the protrusion-type electrode terminals may be configured in a hollow structure including a through-channel communicating with the interior of the battery case. The through-channel may be used as an electrolyte injection port, through which an electrolyte is injected, after the electrode assembly is mounted in the battery case, during the manufacture of the battery cell. That is, at least one of the protrusion-type electrode terminals may be used as the electrolyte injection port, and therefore, there is no need to form an additional electrolyte injection port at the top cap unlike conventional battery cells. Consequently, the through-channel may be sealed, for example, by a metal ball after being used as the electrolyte injection port.

The protrusion-type electrode terminals may be formed in various shapes. For example, in the structure in which the ends of the electrode terminals are pressed to be fixed to the protection circuit module, as previously described, each of the protrusion-type electrode terminals may have a groove depressed from the upper end thereof for allowing the corresponding protrusion-type electrode terminal to be easily pressed.

Also, in the structure in which the ends of the electrode terminals are fixed to the protection circuit module in the mechanical coupling fashion, for example, each of the protrusion-type electrode terminals may be provided at the end thereof with a thread part. In this case, the end of each of the protrusion-type electrode terminals may be threadedly engaged into a nut, in a state in which the ends of the protrusion-type electrode terminals protrude from the top of the protection circuit module, thereby achieving the mechanical coupling between the protrusion-type electrode terminals and the protection circuit module.

The protrusion-type electrode terminals are variously applicable irrespective of the kind and external shape of battery cells. For a prismatic battery cell, for example, the first protrusion-type electrode terminal may be connected to the cathode of the battery cell while being electrically connected to the top cap, and the second protrusion-type electrode terminal may be connected to the anode of the battery cell while being electrically isolated from the top cap. Consequently, it is possible for the first protrusion-type electrode terminal to serve as a cathode terminal and for the second protrusion-type electrode terminal to serve as an anode terminal.

In the above-described structure, the first protrusion-type electrode terminal may be integrally formed with the top cap. That is, the first protrusion-type electrode terminal may be formed simultaneously when pressing the top cap. Of course, however, the protrusion-type electrode terminal may be separately prepared, and then the protrusion-type electrode terminal may be coupled to the top cap. For example, the protrusion-type electrode terminal may be coupled to the top cap by welding. In consideration of productivity, however, it is more preferable to form the protrusion-type electrode terminal using the former method, i.e., to form the protrusion-type electrode terminal simultaneously when pressing the top cap.

In another example, the top cap may be provided with a through-hole, the first protrusion-type electrode terminal and the second protrusion-type electrode terminal may each include a plate-shaped main body, an upper extension extending upward from the main body such that the upper extension is perpendicular from the main body, and a lower extension extending downward from the main body such that the lower extension is perpendicular from the main body, the lower extension being configured to be inserted through the through-hole of the top cap, and, each protrusion-type electrode terminal may be coupled to the top cap by pressing the end of the lower extension in a state in which the lower extension of each protrusion-type electrode terminal is inserted through the through-hole of the top cap.

In the coupling structure between the top cap and the protrusion-type electrode terminals as described above, it is possible for the electrode terminals to be more easily and stably coupled to the top cap. Also, the upper extension and the lower extension of each protrusion-type electrode terminal more securely and stably maintain the coupling of the protection circuit module and the insulative mounting member to the battery cell.

On the other hand, in a structure in which the second protrusion-type electrode terminal serves as the anode, for example, an electrically insulative gasket may be mounted at an interface between the second protrusion-type electrode terminal and the through-hole of the top cap for achieving the insulation between the second protrusion-type electrode terminal and the top cap serving as the cathode.

The upper extension and/or the lower extension may be configured in a structure to be easily pressed. For example, the upper extension and/or the lower extension may have a groove depressed from the end thereof for allowing the upper extension and/or the lower extension to be easily pressed.

The shape of the protrusion-type electrode terminals is not particularly restricted as long as the protrusion-type electrode terminals are easily inserted through the corresponding through-holes of the protection circuit module and the insulative mounting member. For example, the protrusion-type electrode terminals may be formed in the plan shape of a circle, an ellipse, or a rectangle.

Also, the material for the protrusion-type electrode terminals is not particularly restricted as long as the protrusion-type electrode terminals are made of a highly conductive material. Preferably, the protrusion-type electrode terminals are made of a steel coated with copper (Cu), nickel (Ni), and/or chrome (Cr), stainless steel, aluminum (Al), an Al alloy, an Ni alloy, a Cu alloy, or a Cr alloy. When the protrusion-type electrode terminals are integrally formed with the top cap, it is natural that the protrusion-type electrode terminals are made of the same material as the top cap.

In the secondary battery pack with the above-stated construction, the insulative cap may be fixed to the insulative mounting member in various manners, preferably in various coupling fashions, several examples of which will be described below.

In a first embodiment, the insulative mounting member is provided at the top thereof with at least one coupling member protruding upward, the insulative cap is provided with a coupling hole corresponding to the coupling member, and, at the time of mounting the insulative cap to the insulative mounting member loaded on the battery cell, the coupling member of the insulative mounting member is inserted through the coupling hole of the insulative cap, and then an end of the coupling member protruding from the coupling hole is deformed, thereby achieving the coupling of the insulative cap to the insulative mounting member.

In this structure, the coupling of the insulative cap to the insulative mounting member is achieved by inserting the coupling member of the insulative mounting member through the coupling hole of the insulative cap and deforming the end of the coupling member. Consequently, it is possible to achieve the assembly between the insulative cap and the insulative mounting member in a simple coupling fashion.

In the above-described structure, the protruding end of the coupling member may be plastically deformed by various methods. For example, the protruding end of the coupling member may be plastically deformed by thermal welding, vibration welding, or ultrasonic welding such that the protruding end of the coupling member is coupled in the coupling hole. These methods are preferable because the strength of a sheathing part of the battery pack is increases, and the plastic deformation is easily and simply achieved.

Preferably, the coupling member is formed to be greater than the depth of the coupling hole formed at the insulative cap such that, when the coupling member of the insulative mounting member is inserted through the coupling hole of the insulative cap, the end of the coupling member protrudes from the upper end of the coupling hole. For example, the coupling member may protrude from the lower end of the coupling hole by a height equivalent to 120 to 250% of the depth of the coupling hole.

According to circumstances, the insulative cap may be provided at the upper end thereof with a depression part depressed downward by a predetermined depth, and the depression part may have a coupling hole. In this structure, the depression part may be formed in various plan shapes. For example, the depression part may be formed in the plan shape of a semicircle or a semi-ellipse.

Also, the depression parts formed at the opposite ends of the insulative cap may have a shape corresponding to the protruding opposite ends of the insulative mounting member. For example, when the protruding opposite ends of the insulative mounting member are formed in the plan shape of a semicircle, the depression parts of the insulative cap may be also formed in the plan shape of a semicircle.

In a second embodiment, the insulative mounting member is provided at the top thereof with at least one coupling member protruding upward, the insulative cap is provide with a coupling hole corresponding to the protruding coupling member, and, at the time of mounting the insulative cap to the insulative mounting member loaded on the battery cell, the coupling member of the insulative mounting member is inserted through the coupling hole of the insulative cap, and then the coupling member is coupled in the coupling hole in a mechanical coupling fashion, thereby achieving the coupling of the insulative cap to the insulative mounting member.

In this structure, the coupling of the insulative cap to the insulative mounting member is achieved by inserting the coupling member of the insulative mounting member through the coupling hole of the insulative cap and coupling the coupling member in the coupling hole in a mechanical coupling fashion. Consequently, it is possible to achieve the assembly between the insulative cap and the insulative mounting member in a simple coupling fashion.

Preferably, the coupling member is formed on the insulative mounting member in a structure in which the coupling member is elastically deformed and coupled in the coupling hole of the insulative cap at the time of inserting the coupling member of the insulative mounting member through the coupling hole of the insulative cap. That is, the coupling member, formed at the top of the insulative mounting member, is elastically deformed and inserted through the coupling hole of the insulative cap, and the end of the coupling member is elastically restored, whereby the coupling between the insulative cap and the insulative mounting member is achieved.

In this structure, the coupling member and the coupling hole may be formed in various structures in which the coupling member and the coupling hole are elastically coupled to each other. In an exemplary example, the coupling hole may be formed in the shape of a slit, and the coupling member may be formed in the shape of a wedge.

In a concrete example, the insulative cap may be provided with a coupling hole configured in a slit structure having a large length to width ratio, and a coupling member having a shape corresponding to that of the coupling hole, i.e., having a large length to width ratio in a horizontal section thereof and having a wedge shape in a vertical section thereof, may be formed at the insulative mounting member such that the coupling member protrudes upward from the insulative mounting member. In this case, when the wedge-shaped coupling member is inserted through the slit-shaped coupling hole, the end of the coupling member is elastically restored by the wedge structure, whereby the coupling between the insulative cap and the insulative mounting member is easily achieved.

In another example, the coupling member and the coupling hole may be configured in a structure in which the coupling member and the coupling hole have the same horizontal sectional shape, and, when the coupling member is twisted, such that the horizontal sectional shape of the coupling member coincides with that of the coupling hole, and is then inserted through the coupling hole, the coupling member elastically returns to its original shape, whereby the coupling member is coupled in the coupling hole.

As a concrete example of this structure, the coupling member is provided with a coupling protrusion extending radially in a horizontal section from the central axis of the coupling member, and the coupling hole is formed in a shape corresponding to the horizontal sectional shape of the coupling member.

In this case, the coupling protrusion and the coupling hole are offset from each other by a predetermined angle before the coupling protrusion is inserted through the coupling hole. Consequently, the coupling protrusion of the coupling member is inserted through the coupling hole while the coupling protrusion is twisted. After the insertion of the coupling protrusion through the coupling hole, the twisted coupling protrusion of the coupling member returns to its original shape by its elasticity and is fixed in the coupling hole. Consequently, the separation between the coupling member and the coupling hole is prevented. That is, the coupling between the coupling member and the coupling hole is stably achieved.

The horizontal sectional shape of the coupling member and the coupling hole for achieving the above-described elastic coupling structure is not particularly restricted. For example, the coupling member and the coupling hole may have a horizontal sectional shape of '+', 'I', or 'Y'.

Also, the coupling member may be configured in an upward taper structure having a vertical sectional shape of a mushroom such that the coupling member is easily inserted through the coupling hole from below. That is, in the above-described structure, the coupling member is elastically deformed, while being twisted from its original shape into a shape corresponding to the coupling hole, at the time of inserting the coupling member through the coupling hole. After the insertion of the coupling member through the coupling hole, the coupling member returns to its original shape as previously described.

Also, as previously described, the insulative cap may be provided at the upper end thereof with at least one depression part depressed downward by a predetermined depth, and the coupling hole may be formed at the depression part.

This structure is preferred in that the end of the coupling member is located in the depression part at the time of performing the coupling between the coupling member and the coupling hole, whereby, after the coupling is inserted through the coupling hole, the end of the coupling member is prevented from protruding from the upper end of the coupling hole, and therefore, it is possible to prevent the increase in overall volume of the battery pack.

Meanwhile, in the present invention, the coupling member may be integrally formed with the insulative mounting member at the time of forming the insulative mounting member. Alternatively, the coupling member may be separately manufactured, and then the coupling member may be coupled to the insulative mounting member. In consideration of productivity and the coupling strength between the coupling member and the insulative mounting member, it is more preferable to use the former method. When the insulative mounting member is made of a material exhibiting predetermined elasticity, elastic deformation and restoration of the insulative mounting member are achieved at the time of performing the coupling between the insulative mounting member and the coupling hole.

In the secondary battery pack according to the present invention, it is required for the battery case of the battery cell to exhibit easy processability and a mechanical strength of a predetermined level or more. For this reason, the battery case may be a metal container. Preferably, the battery case is an aluminum container.

The material for the insulative mounting member is not particularly restricted as long as the insulative mounting member is insulated from the top cap. For example, the insulative mounting member may be made of a polymer resin simultaneously exhibiting elasticity and mechanical strength. Preferably, a thermoplastic resin, such as polyethylene or polypropylene, is used as the material for the insulative mounting member.

As previously described, the coupling hole is formed at the depression part of the insulative cap, and the coupling member is formed at the region of the insulative mounting member corresponding to the coupling hole, whereby the coupling between the coupling hole and the coupling member is easily achieved. Preferably, the coupling member and the coupling hole are formed at opposite ends of the upper end of the battery cell in consideration of the positions of the protection circuit module and the electrode terminals.

Consequently, the insulative mounting member may have opposite longitudinal-direction ends protruding in an upward direction for securing stable mounting of the protection circuit module to the insulative mounting member, and the coupling member may protrude upward from each longitudinal-direction end of the insulative mounting member.

Meanwhile, the insulative mounting member may be coupled to the battery cell, preferably by a bonding method using an adhesive, such that the insulative mounting member is stably mounted to the top cap.

The insulative cap serves to protect the battery cell from external impact, complement the mechanical strength of the members mounted at the top of the battery cell, and maintain the electrical insulation between the members. Preferably, the insulative cap extends downward by a predetermined length such that at least a portion of the insulative cap covers the outside surface of the upper end of the battery cell in a state in which the insulative cap is mounted to the upper end of the battery cell, thereby improving the coupling to the battery cell. In order to maximize such an effect, the downward extension of the insulative cap is preferably joined to the outer surface of the upper end of the battery cell by bonding or by mechanical coupling.

In addition to the insulative cap coupled to the upper end of the battery cell, an additional insulative cap (a bottom cap) may be also mounted to the lower end of the battery cell. Also, a sheathing film may be attached to the outer surface of the battery case of the battery cell. Consequently, the battery cell may be protected from external impact, and the electrical insulation of the battery cell may be maintained, by the provision of the sheathing film. Preferably, the sheathing film is attached to the outer surface of the battery case such that the sheathing film covers the lower extension of the insulative cap.

The secondary battery pack according to the present invention may be applicable in various manners irrespective of the kind and appearance of the battery cell. Preferably, the battery cell is a prismatic battery having an electrode assembly of a cathode/separator/anode structure mounted in a prismatic metal container.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, exemplary embodiments of the present invention will be described in detail with reference to the accompanying drawings. It should be noted, however, that the scope of the present invention is not limited by the illustrated embodiments.

Figure 1:
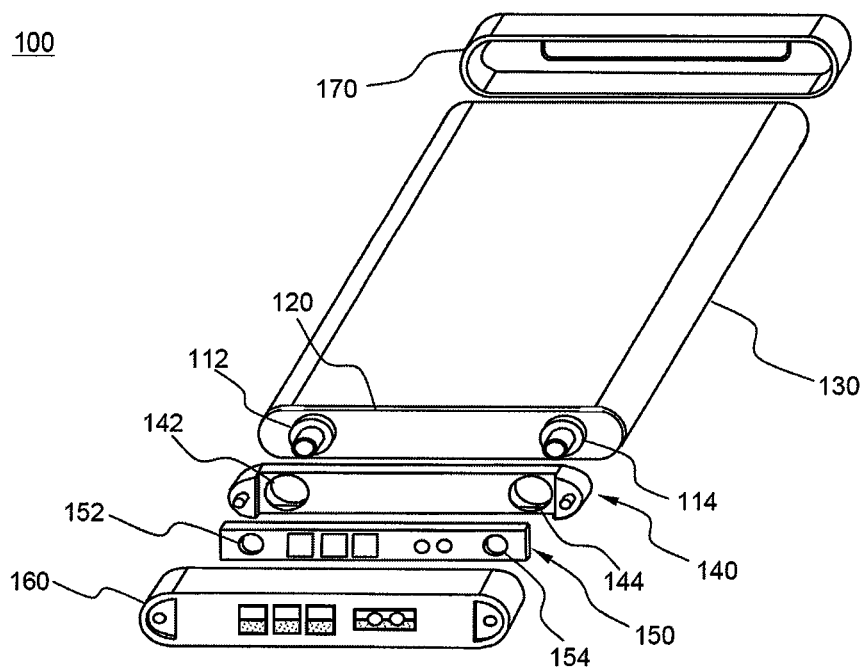
FIG. 1 is an exploded perspective view illustrating a secondary battery pack according to an embodiment of the present invention.

FIG. 1 is an exploded perspective view typically illustrating a secondary battery pack according to an embodiment of the present invention.

Referring to FIG. 1, the secondary battery pack 100 according to this embodiment includes a battery cell 130 having an electrode assembly received in a battery case together with an electrolyte, a top cap 120 for sealing the top, which is open, of the battery case, a plate-shaped protection circuit module 150 having a protection circuit formed thereon, an insulative mounting member 140 mounted to the top cap 120 of the battery cell 130, an insulative cap 160 coupled to the upper end of the battery cell 130 for covering the insulative mounting member 140 in a state in which the protection circuit module 150 is loaded on the insulative mounting member 140, and a bottom cap 170 mounted to the lower end of the battery cell 130.

A pair of protrusion-type electrode terminals 112 and 114, i.e., a first protrusion-type electrode terminal 112 and a second protrusion-type electrode terminal 114, protrude upward from opposite sides of the upper end of the top cap 120. The insulative mounting member 140 is provided with through-holes 142 and 144 having a shape and size corresponding to the lower ends of the protrusion-type electrode terminals 112 and 114. The protection circuit module 150 is provided with through-holes 152 and 154 having a shape and size corresponding to the upper ends of the protrusion-type electrode terminals 112 and 114.

The first protrusion-type electrode terminal 112 is connected to a cathode (not shown) of the battery cell 130 while being electrically connected to the top cap 120. The second protrusion-type electrode terminal 114 is connected to an anode (not shown) of the battery cell 130 while being electrically isolated from the top cap 120.

The coupling of the insulative mounting member 140 and the protection circuit module 150 to the battery cell 130 is achieved by inserting the protrusion-type electrode terminals 112 and 114 through the through-holes 142 and 144, located at the opposite sides of the insulative mounting member 140, and the through-holes 152 and 154, located at the opposite sides of the protection circuit module 150, and pressing the ends of the protrusion-type electrode terminals 112 and 114. Also, the coupling of the insulative mounting member 140 to the top cap 120 may be reinforced by an adhesive.

The insulative cap 160 is coupled to the upper end of the battery cell 130 for covering the insulative mounting member 140 in a state in which the protection circuit module 150 is loaded on the insulative mounting member 140. The insulative cap 160 extends downward by a predetermined length to cover the outside of the upper part of the battery cell 130. The bottom cap 170 is mounted to the lower end of the battery cell 150.

FIGS. 2 to 6 are vertical sectional views typically illustrating various modifications of the first protrusion-type electrode terminal.

Figure 2:
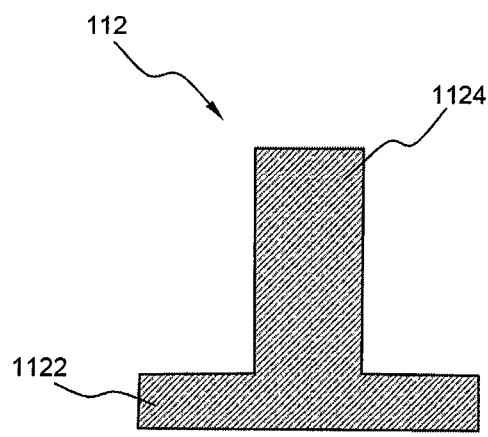
FIGS. 2 to 6 are vertical sectional views typically illustrating various modifications of a first protrusion-type electrode terminal.

Referring to these drawings together with FIG. 1, a first protrusion-type electrode terminal 112 shown in FIG. 2 is a conductive rivet including a plate-shaped head 1122 and a body 1124 extending perpendicularly from the head 1122.

Figure 3:
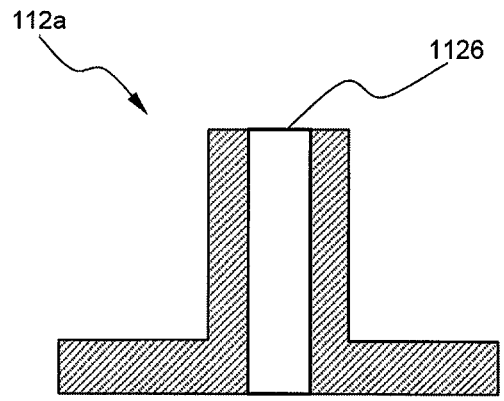

A first protrusion-type electrode terminal 112a shown in FIG. 3 can be easily pressed by virtue of a hollow part 1126 formed at the central region thereof. The hollow part 1126 communicates with the interior of the battery cell 130. Consequently, it is possible for the hollow part 1126 to be used as an electrolyte injection port.

Figure 4:
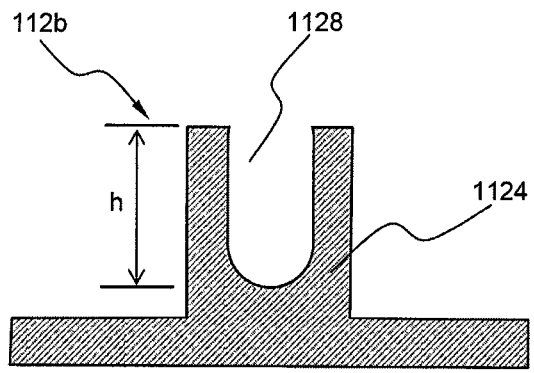

A first protrusion-type electrode terminal 112b shown in FIG. 4 is provided at the central region thereof with a depression groove 1128 depressed from the upper end of the body 1124 by a predetermined depth h. Consequently, it is possible for the body 1124 to easily spread outward when pressing the end of the body 1124.

Figure 5:
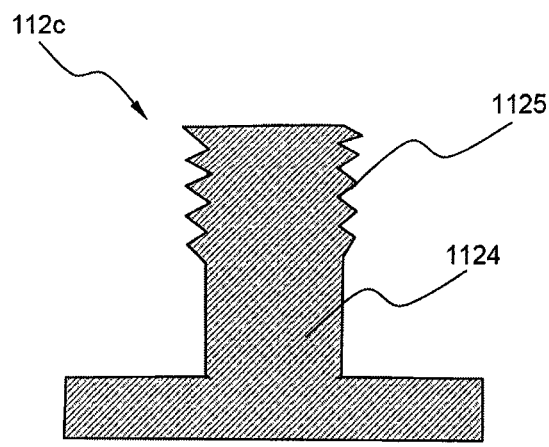

Also, a first protrusion-type electrode terminal 112c shown in FIG. 5 is provided at the end of the body 1124 thereof with a thread part 1125. Consequently, after the first protrusion-type electrode terminal 112c is sequentially inserted through the through-holes 142 and 144 of the insulative mounting member 140 and the through-holes 152 and 154 of the protection circuit module 150, the first protrusion-type electrode terminal 112c may be threadedly engaged into a nut (not shown) by the thread part 1125 provided at the end of the body 1124.

Figure 6:
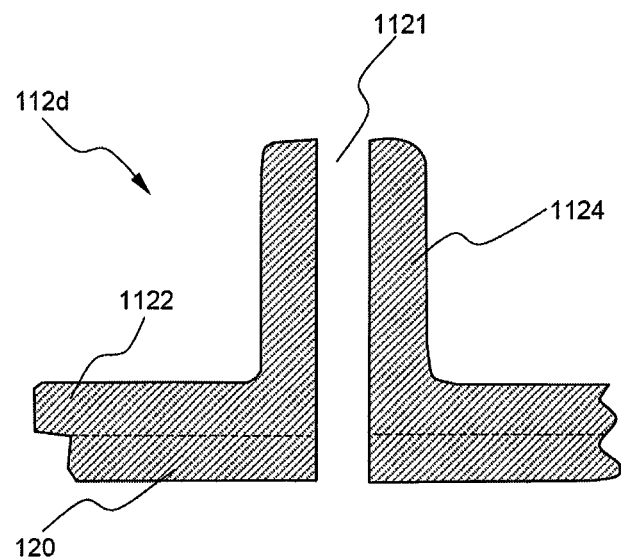

For a first protrusion-type electrode terminal 112d shown in FIG. 6, the lower end of the head 1122 is integrally formed with the top cap 120. Consequently, it is possible to reduce the number of parts when manufacturing the battery pack 100. Also, a through-channel 1121 is formed at the central parts of the head 1122 and the body 1124. The through-channel 1121 may be used as an electrolyte injection port. The first protrusion-type electrode terminal 112d, integrally formed with the top cap 120, may be formed simultaneously when pressing the top cap 120.

Figure 7:
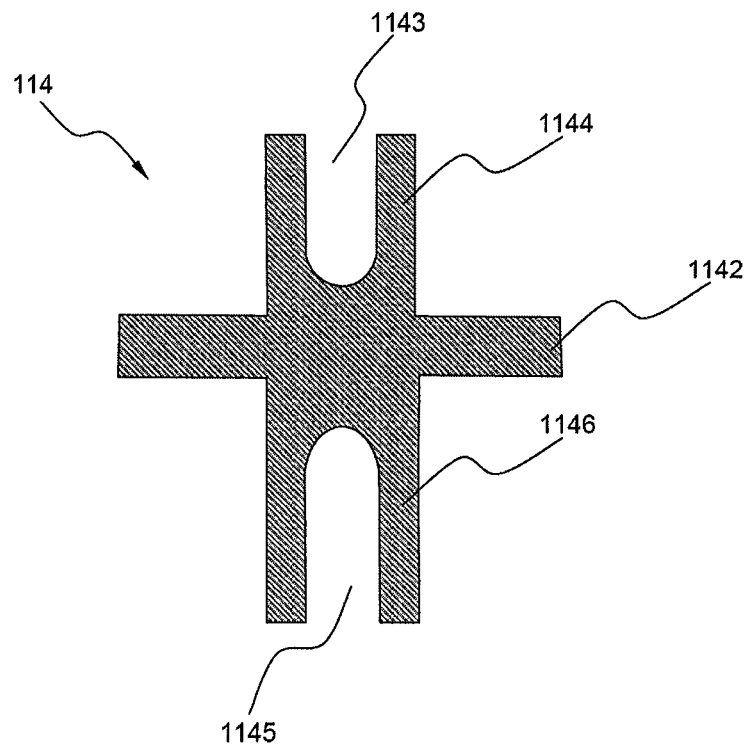
FIG. 7 is a vertical sectional view typically illustrating a second protrusion-type electrode terminal.

FIG. 7 is a vertical sectional view typically illustrating the second protrusion-type electrode terminal.

Referring to FIG. 7, the second protrusion-type electrode terminal 114 includes a plate-shaped main body 1142, an upper extension 1144 extending upward from the main body 1142 such that the upper extension 1144 is perpendicular from the main body 1142, and a lower extension 1146 extending downward from the main body 1142 such that the lower extension 1146 is perpendicular from the main body 1142. The lower extension 1146 is configured to be inserted through a through-hole 122 (FIG. 8) of the top cap 120.

Also, depression grooves 1143 and 1145 are formed at the ends of the upper extension 1144 and the lower extension 1146, respectively. Consequently, the ends of the upper extension 1144 and the lower extension 1146 are easily pressed by the provision of the depression grooves 1143 and 1145.

Figure 8:
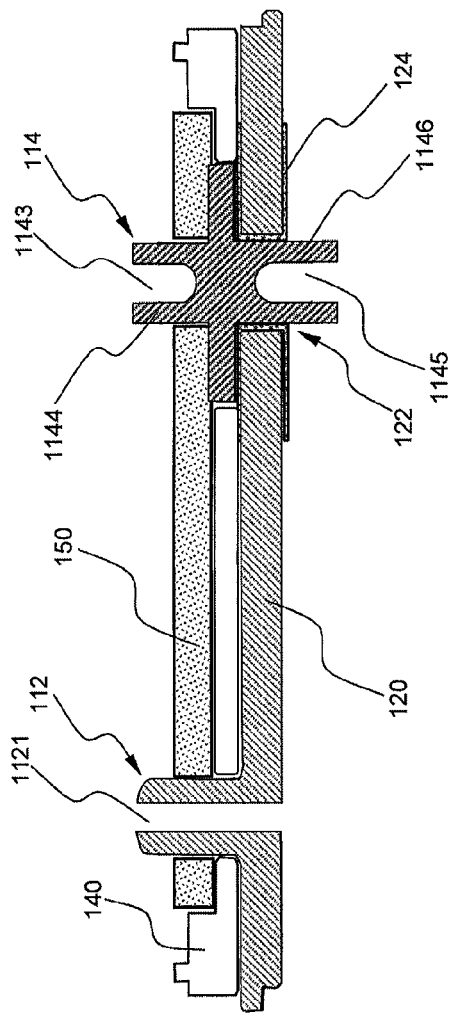
FIG. 8 is a vertical sectional view typically illustrating the upper part of the secondary battery pack according to the present invention.

FIG. 8 is a vertical sectional view typically illustrating the upper part of the secondary battery pack according to the present invention.

Referring to FIG. 8 together with FIG. 1, the insulative mounting member 140 and the protection circuit module 150 are sequentially mounted to the top cap 120, which is integrally formed with the first protrusion-type electrode terminal 112, at the top of the secondary battery pack 100.

As previously described, the through-channel 1121, through which an electrolyte is injected, is formed at the central part of the first protrusion-type electrode terminal 112. Also, the first protrusion-type electrode terminal 112 is integrally formed with the top cap 120.

On the other hand, the lower extension 1146 of the second protrusion-type electrode terminal 114 is inserted through the through-hole 122 of the top cap 120 from above. At the interface between the second protrusion-type electrode terminal 114 and the top cap 120 is mounted an electrically insulative gasket 124 for achieving the insulation between the second protrusion-type electrode terminal 114 and the top cap 120. Also, the depression grooves 1143 and 1145 are formed at the ends of the upper extension 1144 and the lower extension 1146 of the second protrusion-type electrode terminal 114.

In this structure, the first protrusion-type electrode terminal 112 and the second protrusion-type electrode terminal 114 are electrically connected to a circuit of the protection circuit module 150.

Figure 9:
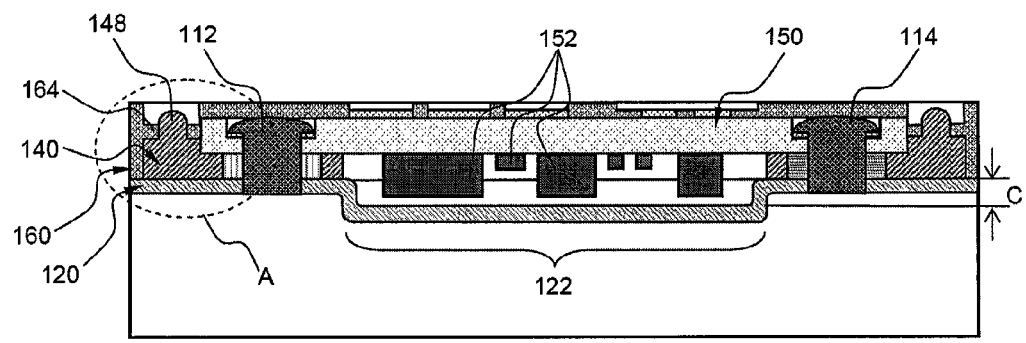
FIG. 9 is a vertical sectional view typically illustrating the upper part of a secondary battery pack according to an embodiment of the present invention.

FIG. 9 is a vertical sectional view typically illustrating the upper part of a secondary battery pack according to an embodiment of the present invention.

Referring to FIG. 9, the ends of the respective protrusion-type electrode terminals 112 and 114 are pressed to be electrically connected to the protection circuit module 150 and, at the same time, mechanically coupled to the protection circuit module 150. The top cap 120 is provided at the central region thereof with a depression space 122, which is depressed downward by a predetermined depth C. Elements 152 loaded at the bottom of the protection circuit module 150 are located in the depression space 122. Coupling members 148 formed at opposite ends of the insulative mounting member 140, mounted to the top of the top cap 120, are fitted in coupling holes 164 of the insulative cap 160.

Figure 10:
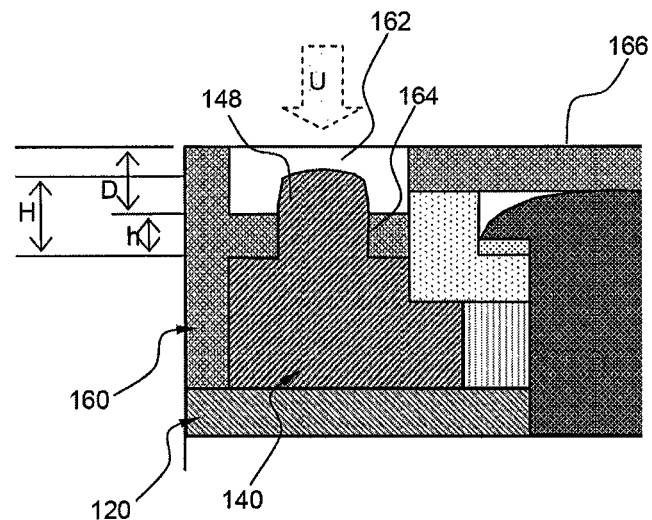
FIG. 10 is an enlarged vertical sectional view typically illustrating region A of FIG. 9.
Figure 11:
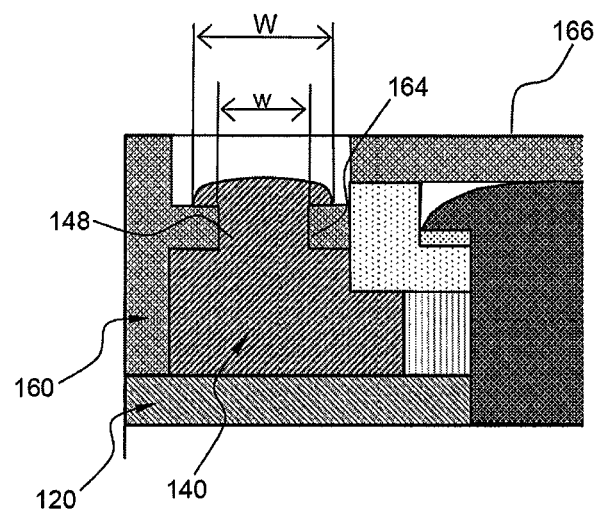
FIG. 11 is a vertical sectional view typically illustrating region A after deforming the end of a coupling member by ultrasonic welding.

FIG. 10 is an enlarged vertical sectional view typically illustrating region A of FIG. 9, and FIG. 11 is a vertical sectional view typically illustrating region A after deforming the end of the coupling member shown in FIG. 10 by ultrasonic welding.

Referring to these drawings, the coupling member 148, formed at the top of the insulative mounting member 140, has a height H equivalent to approximately 200% of the height a of the corresponding coupling hole 164 of the insulative cap 160. Consequently, when the coupling member 148 is inserted through the coupling hole 164, the end of the coupling member 148 extrudes upward from the upper end of the coupling hole 164. The protruding end of the coupling member 148 is plastically deformed by ultrasonic welding U, with the result that the end of the coupling member 148 has a width W greater than the width w of the coupling hole 164. Consequently, as shown in FIG. 11, the coupling hole 164 is sealed and fixed by the coupling member 148.

A depression part 162, depressed downward, of the insulative cap 160 has a predetermined depth D. Consequently, the end of the coupling member 148 is prevented from protruding upward from the top 166 of the insulative cap 160.

Figure 12:
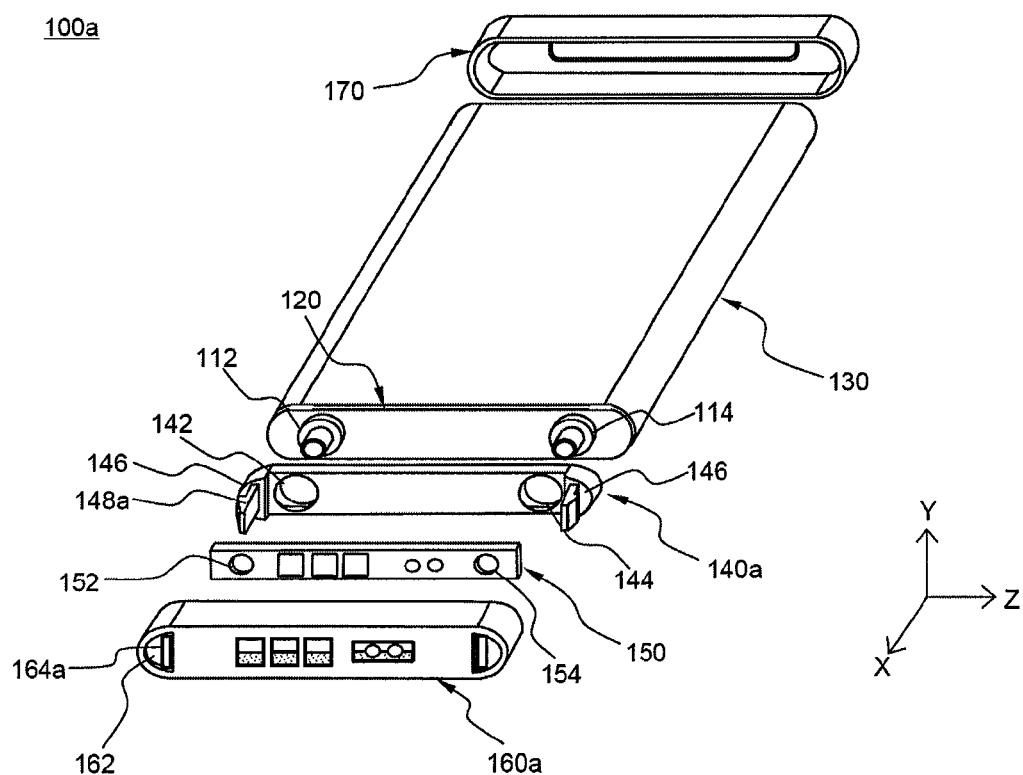
FIG. 12 is an exploded perspective view illustrating a secondary battery pack according to another embodiment of the present invention.

FIG. 12 is an exploded perspective view illustrating a secondary battery pack according to another embodiment of the present invention.

Referring to FIG. 12, the secondary battery pack 100a includes a battery cell 130 having an electrode assembly received in a battery case together with an electrolyte, a top cap 120 for sealing the top, which is open, of the battery case, a plate-shaped protection circuit module 150 having a protection circuit formed thereon, an insulative mounting member 140a mounted to the top cap 120 of the battery cell 130, an insulative cap 160a coupled to the upper end of the battery cell 130 for covering the insulative mounting member 140a in a state in which the protection circuit module 150 is loaded on the insulative mounting member 140a, and a bottom cap 170 mounted to the lower end of the battery cell 130.

The insulative mounting member 140a has opposite ends 146 protruding in the upward direction X. The protection circuit module 150 is located between the opposite ends 146 of the insulative mounting member 140a, whereby the protection circuit module 150 is stably mounted. Also, coupling members 148a are formed at the protruding opposite ends 146 of the insulative mounting member 140a such that the coupling members 148a protrude from the opposite ends 146 of the insulative mounting member 140a in the upward direction X.

The insulative cap 160a is provided, at opposite ends thereof corresponding to the protruding opposite ends 146 of the insulative mounting member 140a, with depression parts 162 formed in the plan shape of a semicircle. In the depression parts 162 are formed coupling holes 164a, through which the coupling members 148a of the insulative mounting member 140a are inserted.

Consequently, when assembling the secondary battery pack 100a, the coupling members 148a of the insulative mounting member 140a are inserted through the corresponding coupling holes 164a of the insulative cap 160a, and the coupling members 148a are mechanically coupled in the corresponding coupling holes 164a. As a result, the coupling between the insulative mounting member 140a and the insulative cap 160a is easily achieved.

Also, the battery cell 130 includes a first protrusion-type electrode terminal 112 and a second protrusion-type electrode terminal 114 protruding from opposite sides of the upper end of the top cap 120 in the upward direction X. The insulative mounting member 140a is provided with through-holes 142 and 144 having a shape and size corresponding to the lower ends of the protrusion-type electrode terminals 112 and 114. The protection circuit module 150 is provided with through-holes 152 and 154 having a shape and size corresponding to the upper ends of the protrusion-type electrode terminals 112 and 114.

The first protrusion-type electrode terminal 112 is connected to a cathode (not shown) of the battery cell 130 while being electrically connected to the top cap 120. The second protrusion-type electrode terminal 114 is connected to an anode (not shown) of the battery cell 130 while being electrically isolated from the top cap 120.

The coupling of the insulative mounting member 140a and the protection circuit module 150 to the battery cell 130 is achieved by inserting the protrusion-type electrode terminals 112 and 114 through the through-holes 142 and 144, located at the opposite sides of the insulative mounting member 140a, and the through-holes 152 and 154, located at the opposite sides of the protection circuit module 150, and pressing the ends of the protrusion-type electrode terminals 112 and 114. Also, the coupling of the insulative mounting member 140a to the top cap 120 may be reinforced by an adhesive.

The insulative cap 160a is coupled to the upper end of the battery cell 130 for covering the insulative mounting member 140a in a state in which the protection circuit module 150 is loaded on the insulative mounting member 140a. The insulative cap 160a extends downward by a predetermined length to cover the outside of the upper part of the battery cell 130. The bottom cap 170 is mounted to the lower end of the battery cell 150.

Figure 13:
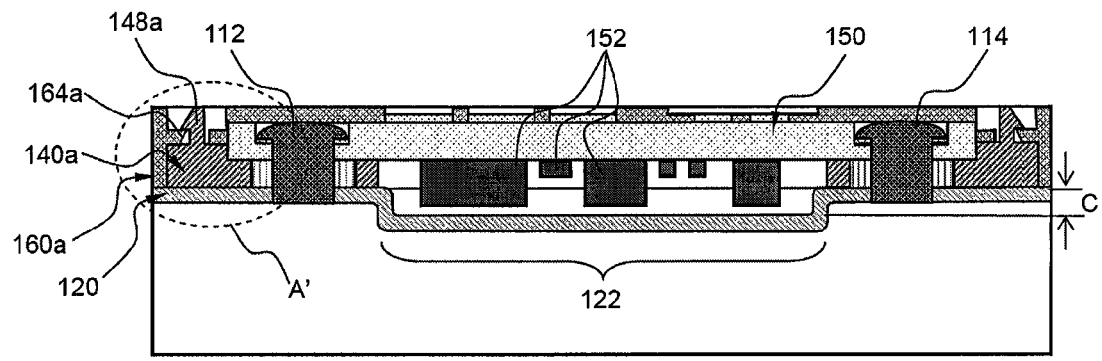
FIG. 13 is a vertical sectional view typically illustrating the upper part of the secondary battery pack shown in FIG. 12.

FIG. 13 is a vertical sectional view typically illustrating the upper part of the secondary battery pack shown in FIG. 12.

Referring to FIG. 13, the ends of the respective protrusion-type electrode terminals 112 and 114 are pressed to be electrically connected to the protection circuit module 150 and, at the same time, mechanically coupled to the protection circuit module 150. The top cap 120 is provided at the central region thereof with a depression space 122, which is depressed downward by a predetermined depth C. Elements 152 loaded at the bottom of the protection circuit module 150 are located in the depression space 122. Consequently, it is possible to further reduce the installation height of the protection circuit module 150 by the depression space 122, thereby increasing the capacity of the battery pack as compared with other battery packs having the same standard.

Coupling member 148a formed at opposite ends of the insulative mounting member 140a, mounted to the top of the top cap 120, are fitted in coupling holes 164a of the insulative cap 160a, thereby achieving a stable coupling structure.

Figure 14:
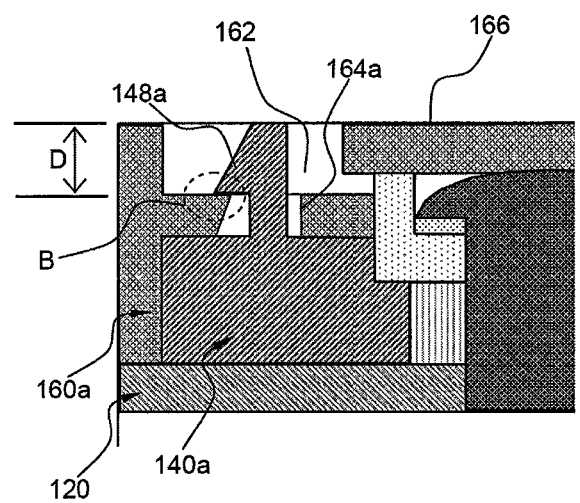
FIGS. 14 and 15 are an enlarged vertical sectional view and an enlarged plan view typically illustrating region A' of FIG. 13, respectively.
Figure 15:
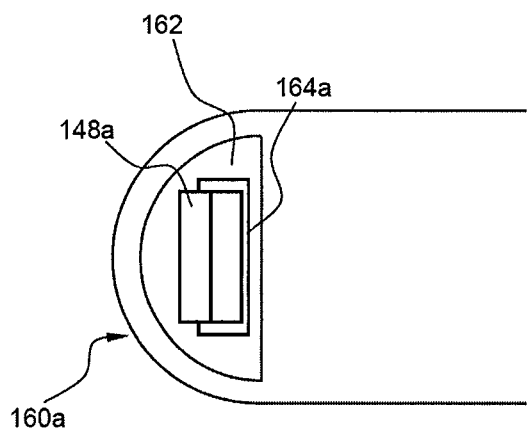
Figure 16:
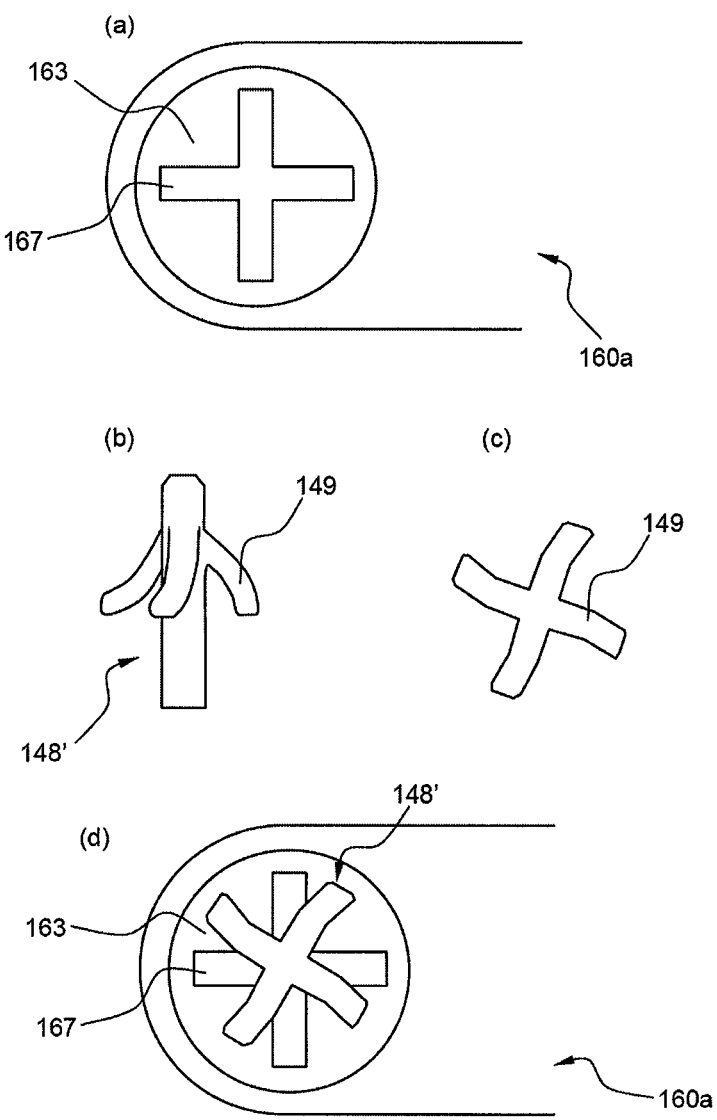
FIGS. 16A to 16D are typical views illustrating various coupling structures between a coupling hole and a coupling member according to other embodiments of the present invention.

FIGS. 14 and 15 are an enlarged vertical sectional view and an enlarged plan view typically illustrating region A' of FIG. 13, respectively.

Referring to these drawings, each coupling member 148a of the insulative mounting member 140a is formed in the shape of a wedge, and each coupling hole 164a of the insulative cap 160a is formed in the shape of a slit. The wedge-shaped coupling member 148a, formed at the top of the insulative mounting member 140a, is elastically inserted through the corresponding coupling hole 164a of the insulative cap 160a, and wedge-shaped one end of the coupling member 148a is caught by the upper end of the coupling hole 164a of the insulative cap 160a by a restoring force of the coupling member 148a. Consequently, the coupling member 148a, inserted through the corresponding coupling hole 164a of the insulative cap 160a, is prevented from separating from the coupling hole 164a by the wedge structure of the coupling member 148a.

Also, the coupling member 148a is configured in an upward taper structure having a vertical sectional shape of a mushroom. Consequently, it is possible for the coupling member 148a to be easily inserted through the corresponding coupling hole 164a from below. Furthermore, since the depression part 162, depressed downward, of the insulative cap 160a has a predetermined depth D, the end of the coupling member 148a is prevented from protruding upward from the top 166 of the insulative cap 160a.

FIGS. 16A to 16D are typical views illustrating various coupling structures between the coupling hole and the coupling member according to other embodiments of the present invention.

Referring to FIGS. 16A to 16D, a cross-shaped, i.e., '+'-shaped, coupling hole 167 formed at a depression part 163 formed at one end of the insulative cap 160a is illustrated in a typical plan view (FIG. 16A), a coupling member 148' having four coupling protrusions 149 corresponding to the cross-shaped coupling hole 167 is illustrated in a typical front view (FIG. 16B) and a typical plan view (FIG. 16C), and a structure in which the coupling member 148' is coupled in the depression part 163 is illustrated in a typical plan view (FIG. 16D).

Consequently, when the coupling member 148' is inserted through the coupling hole 167 of the insulative cap (not shown), the coupling protrusions 149, made of a plastic resin, are twisted by their elasticity, with the result that the coupling protrusions 149 are inserted through the cross-shaped coupling hole 167. After the insertion of the coupling protrusions 149 through the cross-shaped coupling hole 167, the coupling protrusions 149 return to their original shape by their restoring force, with the result that the secure coupling between the coupling hole and the coupling member is achieved.

Figure 17:
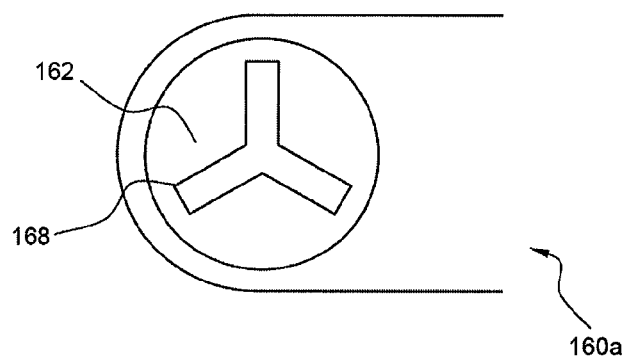
FIGS. 17 and 18 are typical views illustrating modifications of a coupling hole structure according to other embodiments of the present invention.
Figure 18:
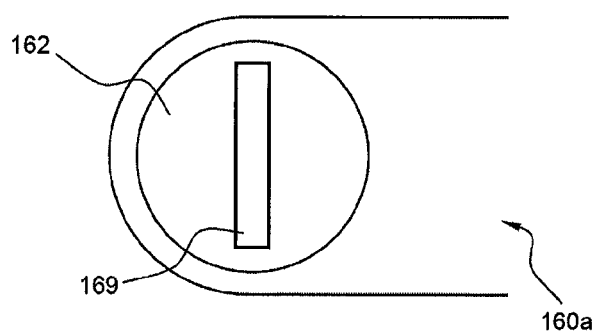

FIGS. 17 and 18 are typical views illustrating modifications of a coupling hole structure according to other embodiments of the present invention.

Referring to these drawings, a 'Y'-shaped coupling hole 168 or an 'I'-shaped coupling hole 169 is formed at the depression part 162 of the insulative cap 160a. A coupling member (not shown) corresponding to the coupling hole 168 or 169 is identical in a coupling principle to those illustrated in FIG. 14 or 16 except that the coupling member has coupling protrusions of which the number is different from that of the coupling protrusions 149 of the coupling member 148 or 148' of FIG. 14 or 16. Therefore, a detailed description of the coupling member will not be given.

Figure 19:
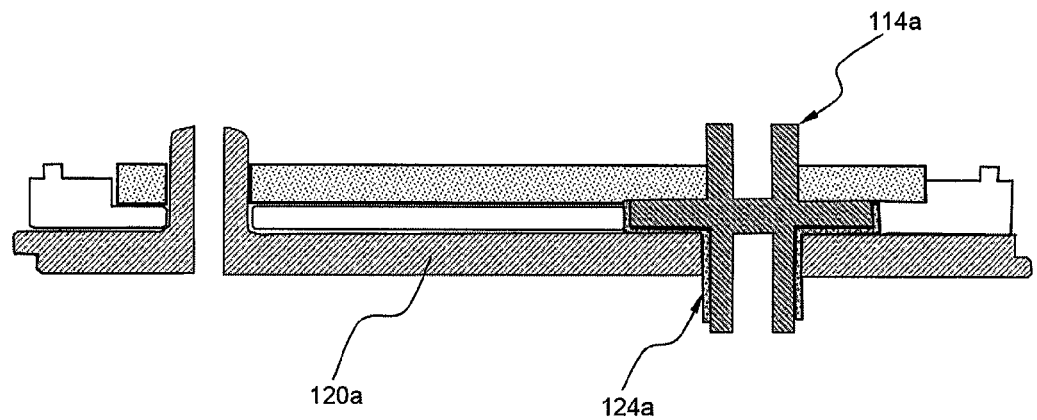
FIG. 19 is a vertical sectional view typically illustrating the upper part of a secondary battery pack according to another embodiment of the present invention.
Figure 20:
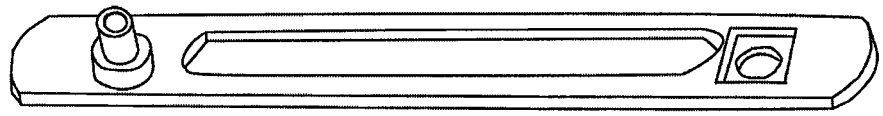
FIGS. 20 to 22 are perspective views illustrating a top cap, an electrically insulative gasket, and a second protrusion-type electrode terminal of FIG. 19, respectively.
Figure 21:
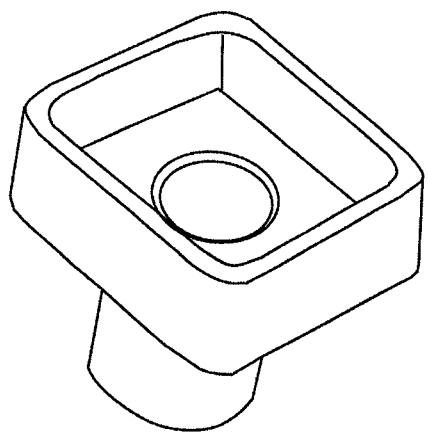
Figure 22:
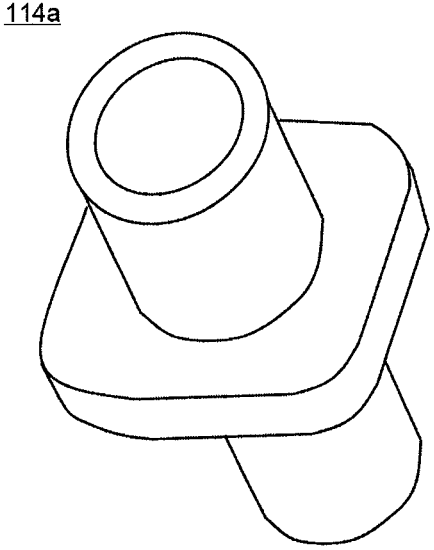

FIG. 19 is a vertical sectional view typically illustrating the upper part of a secondary battery pack according to another embodiment of the present invention, and FIGS. 20 to 22 are perspective views typically illustrating a top cap 120a, an electrically insulative gasket 124a, and a second protrusion-type electrode terminal 114a of FIG. 19, respectively.

Referring to these drawings, the electrically insulative gasket 124a and the second protrusion-type electrode terminal 114a are identical in structure to the electrically insulative gasket 124 and the second protrusion-type electrode terminal 114 of FIG. 8 except that the electrically insulative gasket 124a and the second protrusion-type electrode terminal 114a are slightly different in shape from the electrically insulative gasket 124 and the second protrusion-type electrode terminal 114. Therefore, a detailed description of the electrically insulative gasket 124a and the second protrusion-type electrode terminal 114a will not be given.

INDUSTRIAL APPLICABILITY

As apparent from the above description, the secondary battery pack according to the present invention is characterized in that the coupling between the insulative mounting member and the protection circuit module at the top of the battery pack is achieved using the protrusion-type electrode terminals of specific structures. Consequently, the present invention has the effect of greatly simplifying the assembling process and improving the structural stability of the battery pack by excellent coupling strength. Also, the protrusion-type electrode terminals are not exposed outward from the battery. Consequently, the present invention has the effect of improving the reliability of a product in appearance and preventing the occurrence of a short circuit.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery pack comprising:
   a battery cell having an electrode assembly mounted in a battery case together with an electrolyte, the battery case having an open top sealed by a top cap;
   a protection circuit module having a protection circuit for controlling overcharge, overdischarge, and overcurrent of the battery cell;
   an insulative mounting member constructed in a structure in which the protection circuit module is loaded at a top of the insulative mounting member, the insulative mounting member being mounted to the top cap of the battery cell; and an insulative cap coupled to an upper end of the battery cell for covering the insulative mounting member in a state in which the protection circuit module is loaded on the insulative mounting member, wherein the top cap is provided with a pair of protrusion electrode terminals including a first protrusion electrode terminal connected to a cathode of the electrode assembly and a second protrusion electrode terminal connected to an anode of the electrode assembly, the insulative mounting member is provided with through-holes corresponding to the protrusion electrode terminals, the protection circuit module is provided with through-holes corresponding to the protrusion electrode terminals, and the coupling of the insulative mounting member and the protection circuit module to the battery cell is achieved by successively fixedly inserting the protrusion electrode terminals through the through-holes of the insulative mounting member and through the through-holes of the protection circuit module.

2. The secondary battery pack according to claim 1, wherein the protrusion electrode terminals have a conductive rivet structure.

3. The secondary battery pack according to claim 1, wherein ends of the protrusion electrode terminals protrude from a top of the protection circuit module by a predetermined length, the ends of the protrusion electrode terminals being pressed to be fixed to the protection circuit module.

4. The secondary battery pack according to claim 1, wherein ends of the protrusion electrode terminals protrude from a top of the protection circuit module by a predetermined length, the protruding ends of the protrusion electrode terminals being fixed to the protection circuit module in a mechanical coupling fashion.

5. The secondary battery pack according to claim 3, wherein at least one of the protrusion electrode terminals has a hollow structure including a through-channel communicating with an interior of the battery case.

6. The secondary battery pack according to claim 5, wherein the through-channel is sealed by a metal ball after being used as an electrolyte injection port.

7. The secondary battery pack according to claim 3, wherein each of the protrusion electrode terminals has a groove depressed from an upper end thereof for allowing the corresponding protrusion electrode terminal to be easily pressed.

8. The secondary battery pack according to claim 1, wherein the first protrusion electrode terminal has a lower end integrally formed with the top cap.

9. The secondary battery pack according to claim 1, wherein the top cap is provided with a through-hole,
the second protrusion electrode terminal includes a plate-shaped main body, an upper extension extending upward from the main body such that the upper extension is perpendicular from the main body, and a lower extension extending downward from the main body such that the lower extension is perpendicular from the main body, the lower extension being inserted through the through-hole of the top cap, and
the second protrusion electrode terminal is coupled to the top cap by pressing an end of the lower extension.

10. The secondary battery pack according to claim 9, further comprising:

an electrically insulative gasket mounted at an interface between the second protrusion electrode terminal and the through-hole of the top cap for achieving the insulation between the second protrusion electrode terminal and the top cap.

11. The secondary battery pack according to claim 10, wherein the upper extension, the lower extension or the upper extension and the lower extension has a groove depressed from an end thereof for allowing the upper extension, the lower extension or the upper extension and the lower extension to be easily pressed.

12. The secondary battery pack according to claim 1, wherein the insulative mounting member is provided at the top thereof with at least one coupling member protruding upward, the insulative cap is provided with a coupling hole corresponding to the coupling member, and, at the time of mounting the insulative cap to the insulative mounting member loaded on the battery cell, the coupling member of the insulative mounting member is inserted through the coupling hole of the insulative cap, and then an end of the coupling member protruding from the coupling hole is deformed, thereby achieving the coupling of the insulative cap to the insulative mounting member.

13. The secondary battery pack according to claim 12, wherein the protruding end of the coupling member is plastically deformed by thermal welding, vibration welding, or ultrasonic welding such that the protruding end of the coupling member is coupled in the coupling hole.

14. The secondary battery pack according to claim 12, wherein the insulative cap is provided at an upper end thereof with a depression part depressed downward by a predetermined depth, the depression part having a coupling hole.

15. The secondary battery pack according to claim 1, wherein the insulative mounting member is provided at the top thereof with at least one coupling member protruding upward, the insulative cap is provided with a coupling hole corresponding to the protruding coupling member, and, at the time of mounting the insulative cap to the insulative mounting member loaded on the battery cell, the coupling member of the insulative mounting member is inserted through the coupling hole of the insulative cap, and then the coupling member is coupled in the coupling hole in a mechanical coupling fashion, thereby achieving the coupling of the insulative cap to the insulative mounting member.

16. The secondary battery pack according to claim 15, wherein the coupling member is formed on the insulative mounting member in a structure in which the coupling member is elastically deformed and coupled in the coupling hole of the insulative cap at the time of inserting the coupling member of the insulative mounting member through the coupling hole of the insulative cap.

17. The secondary battery pack according to claim 15, wherein the coupling hole is formed in the shape of a slit, and the coupling member is formed in the shape of a wedge.

18. The secondary battery pack according to claim 15, wherein the coupling member and the coupling hole have the same horizontal sectional shape, and, when the coupling member is twisted, such that the horizontal sectional shape of the coupling member coincides with that of the coupling hole, and is then inserted through the coupling hole, the coupling member elastically returns to its original shape, whereby the coupling member is coupled in the coupling hole.

19. The secondary battery pack according to claim 18, wherein the coupling member and the coupling hole have a horizontal sectional shape of '+', 'I', or 'Y'.

20. The secondary battery pack according to claim 18, wherein the coupling member has an upward taper structure having a vertical sectional shape of a mushroom such that the coupling member is easily inserted through the coupling hole from below.

21. The secondary battery pack according to claim 1, wherein the insulative mounting member has opposite longitudinal-direction ends protruding in an upward direction for securing stable mounting of the protection circuit module to the insulative mounting member.

22. The secondary battery pack according to claim 21, wherein the coupling member protrudes upward from each longitudinal-direction end of the insulative mounting member.

23. The secondary battery pack according to claim 1, wherein the battery cell is a prismatic lithium secondary battery.

\* \* \* \* \*